United States Patent
Boyer et al.

(10) Patent No.: US 9,421,884 B2
(45) Date of Patent: Aug. 23, 2016

(54) PRESSURE-RESPONSIVE SEAT OCCUPANCY SENSOR UNIT

(71) Applicant: IEE INTERNATIONAL ELECTRONICS & ENGINEERING S.A., Echternach (LU)

(72) Inventors: Philippe Boyer, Boust (FR); Markus Kordel, Trier (DE); Dietmar Jungen, Mehren (DE); Sanel Imamovic, Differdange (LU)

(73) Assignee: IEE International Electronics & Engineering S.A., Echternach (LU)

( * ) Notice: Subject to any disclaimer, the term of this patent is extended or adjusted under 35 U.S.C. 154(b) by 0 days.

(21) Appl. No.: 14/400,209

(22) PCT Filed: May 6, 2013

(86) PCT No.: PCT/EP2013/059328
§ 371 (c)(1),
(2) Date: Nov. 10, 2014

(87) PCT Pub. No.: WO2013/167503
PCT Pub. Date: Nov. 14, 2013

(65) Prior Publication Data
US 2015/0123436 A1    May 7, 2015

(30) Foreign Application Priority Data
May 10, 2012 (LU) .......................................... 91995

(51) Int. Cl.
*G01L 1/26* (2006.01)
*B60N 2/00* (2006.01)
(Continued)

(52) U.S. Cl.
CPC ...... *B60N 2/002* (2013.01); *B60N 2/64* (2013.01); *B60N 2/646* (2013.01); *B60R 21/01524* (2014.10); *G01G 19/08* (2013.01); *G01L 1/142* (2013.01)

(58) Field of Classification Search
CPC ...... B60N 2/002; B60N 2/64; G01G 19/4142; G01G 19/08; G01L 1/142

USPC ....................................... 73/862.381, 862.391
See application file for complete search history.

(56) References Cited

U.S. PATENT DOCUMENTS

| 2004/0036325 | A1* | 2/2004 | Diemer | H05B 3/146 297/180.12 |
| 2004/0183688 | A1* | 9/2004 | Orlewski | B60N 2/002 340/667 |
| 2005/0225128 | A1* | 10/2005 | Diemer | B60N 2/002 297/180.12 |

(Continued)

FOREIGN PATENT DOCUMENTS

| DE | 19752976 A1 | 6/1998 |
| DE | 202010003563 U1 | 8/2010 |

(Continued)

OTHER PUBLICATIONS

International Search Report issued Sep. 3, 2013 re: Application No. PCT/EP2013/059328; citng: JP 2011105278 A, WO 2007/107522 A1, WO 2013/002289 A1 and JP 49 132105 U.

*Primary Examiner* — Max Noori
(74) *Attorney, Agent, or Firm* — Reising Ethington P.C.

(57) ABSTRACT

A pressure-responsive seat occupancy sensor unit (10) for detecting an occupancy state of a seat comprises a support plate (12) with a support area (14), a pressure-responsive membrane switch (15), one or more spacers (16) arranged around the support area and a compressible foam. The membrane switch comprises a first carrier film and a second carrier film spaced from each other by a spacer film. The spacer film has therein an opening defining a cell. The membrane switch comprises at least two electrodes arranged in facing relationship with each other in the cell on the first and the second carrier film, respectively, in such a way that they are brought closer together, possibly into contact with each other, when sufficient pressure is applied on the membrane switch. The one or more spacers (16) protrude from the support, and define an upper surface (20) raised with respect to the support area. The compressible foam (18) rests with its bottom surface (22) on the upper surface of the one or more spacers. The compressible foam penetrates into the support area in between the one or more spacers and activates the pressure-responsive membrane switch in response to a force applied on the top surface that exceeds a certain threshold force.

19 Claims, 6 Drawing Sheets

(51) Int. Cl.
  *B60N 2/64* (2006.01)
  *B60R 21/015* (2006.01)
  *G01G 19/08* (2006.01)
  *G01L 1/14* (2006.01)

(56) References Cited

U.S. PATENT DOCUMENTS

2007/0144273 A1* 6/2007 Decoster ........... B60R 21/01532
                                                          73/862.391
2008/0315639 A1* 12/2008 Wenmackers ......... B60N 2/002
                                                          297/217.3
2009/0157256 A1* 6/2009 Hwang ............. B60R 21/01516
                                                          701/36

FOREIGN PATENT DOCUMENTS

| JP | 49132105 U | 11/1974 |
| JP | 2011105278 A | 6/2011 |
| WO | 2007107522 A1 | 9/2007 |
| WO | 2013002289 A1 | 1/2013 |

* cited by examiner

PRESSURE-RESPONSIVE SEAT OCCUPANCY SENSOR UNIT

TECHNICAL FIELD

The present invention generally relates to sensing the occupancy state of a vehicle seat. Specifically, the invention relates to a pressure-responsive seat occupancy sensor unit for being placed on the bottom side of a seat cushion; i.e. between the seat cushion and the cushion-supporting means such as, e.g. a seat pan, springs etc.

BACKGROUND ART

Seat occupancy sensors are nowadays widely used in automotive vehicles to provide a seat occupancy signal for various appliances, such as, e.g. a seat belt reminder, an auxiliary restraint system (airbag), etc. Seat occupancy sensors exist in a number of variants, e.g. based on capacitive sensing, deformation sensing or pressure (force) sensing. Pressure-sensitive seat occupancy sensors have typically been arranged between the foam body of the seat cushion and the seat cover.

The possibility of customization and personalization of the vehicle by the customer is a key selling factor of modern cars. This leads to many different variants of car interiors being offered for one car model. With the increasing number of available options, severe constraints arise concerning the implementation of technical equipment in the vehicle. With seat occupancy sensors arranged between the foam body of the seat cushion and the seat cover, every seat design (leather, cloth, sport, comfort, . . . ) requires specific development effort for the occupant detection system. That induces high development costs and therefore is an unattractive solution for the automotive industry. A problem to be solved is, therefore, to find a sensor solution, which is less influenced by seat design and thus can be used for a greater variety of car seats or even car platforms.

Document DE 197 52 976 A1 discloses a vehicle seat occupancy sensor in the shape of a film-type pressure sensor. The pressure sensor includes a first carrier film, a spacer and a second carrier film, which are disposed on one another in the manner of a sandwich. Contact elements are arranged on the inner surfaces of the carrier films. An opening in the spacer allows the contact elements to get into contact with each other when pressure is applied on the sensor. The pressure sensor is arranged inside a cavity on the bottom side of the foam cushion of the vehicle seat. The pressure sensor is supported by a foam block, which closes the cavity and which rests on the seat pan.

Document DE 20 2010 003 563 U1 discloses a pressure-sensor unit, comprising a film-type pressure sensor. The pressure sensor includes two films maintained at a distance by a spacer material arranged there between. The pressure sensor is disposed on a compressible intermediate layer, which is, in turn arranged on a base plate.

With pressure sensor units arranged on the B-surface of the seat cushion (i.e. on the side facing away from that on which an occupant may seat himself, between the seat cushion and the support thereof), the seat cushion transfers the pressure from the seating surface to the pressure sensor unit. As a matter of fact, the padding of the seat cushion becomes part of the measurement unit. Whereas the production tolerances of film-type pressure sensors may be controlled such that a uniform activation pressure threshold (i.e. the pressure, at which the films of the pressure sensor get into contact with each other) is achieved for the whole production, important investments would be necessary in the seat manufacturers' production in order to guarantee that the foam of every seat cushion has exactly the same thickness and behaves the same way under pressure, in particular, transfers the same amount of pressure to the pressure-sensor unit.

BRIEF SUMMARY

The invention provides a pressure-responsive B-surface seat occupancy sensor unit compatible with the production tolerances of vehicle seats.

According to the invention, a pressure-responsive seat occupancy sensor unit for detecting an occupancy state of a seat, in particular a vehicle seat, comprises a support plate with a support area, a pressure-responsive membrane switch, one or more spacers arranged around the support area and a compressible foam. The pressure-responsive membrane switch comprises a first carrier film and a second carrier film spaced from each other by a spacer film. The spacer film has therein an opening defining a cell. The pressure-responsive membrane switch comprises at least two electrodes arranged in facing relationship with each other in the cell on the first and the second carrier film, respectively, in such a way that they are brought closer together, possibly into contact with each other, when sufficient pressure is applied on the pressure-responsive membrane switch. The one or more spacers protrude from the support, and define an upper surface raised with respect to the support area. The compressible foam comprises a bottom surface and a top surface. The compressible foam rests with its bottom surface on the upper surface of the one or more spacers. The compressible foam is disposed in such a way that it penetrates into the support area in between the one or more spacers and activates the pressure-responsive membrane switch in response to a force applied on the top surface that exceeds a certain threshold force.

As used herein, the threshold force designates the force applied on the top surface of the seat that induces sufficient compression of the foam to result in an activation of the pressure-responsive membrane switch. The threshold force is preferably selected such that a 5th-percentile female or heavier occupant sitting on the seat causes the activation of the pressure-responsive membrane switch, whereas lighter occupants (e.g. a child in a child seat) or objects (e.g. a handbag, a laptop computer etc.) fail to do so.

As will be appreciated, the one or more spacers guarantee that the compressible foam is located at a well-defined distance from the pressure-responsive membrane switch while the seat is not occupied. In comparison with a pressure-responsive seat occupancy sensor unit of the prior art, wherein the foam is in contact with the membrane switch all the time, the production requirements, in particular as regards the thickness of the compressible foam, can be considerably relaxed. Foams for car seats manufactured using the current production techniques are thus compatible with the present invention.

The pressure-responsive seat occupancy sensor unit is preferably configured in such a way so as to have no negative impact on the occupant's seating comfort and not to influence (shift) the H-point of the car. The pressure-responsive seat occupancy sensor unit is advantageously located below the H-point and vertically aligned with the H-point.

The one or more spacers are preferably substantially incompressible (i.e. do not significantly yield under typical forces induced by an occupant). The one or more spacers preferably comprise a plurality of struts or a raised border. They can have a plurality of forms e.g. the form of a ridge, a raised C-shape, a raised D-shape, a raised U-shape, a raised O-shape or a raised L-shape. One or more parts of the support plate may be bent so as to protrude with respect to the support area and to form the one or more spacers.

It should be noted that the term "around", as used herein in context with the one or more spacers, is not intended to be limited to an arrangement of the one or more spacers that completely encloses the support area in the plane of the support plate. In other words, the one or more spacers need not define a closed raised perimeter of the support area. If there is more than one spacer, they may be arranged spaced from one another. If there is a single spacer, it may have an opening.

Advantageously, the one or more spacers have a lateral surface facing the support area perpendicular to or inclined with respect to the support plate. The one or more spacers and the support plate can be formed of one piece (of plastic or metal or the like).

Preferably, the compressible foam has a linear compressibility greater than the difference in height between the upper surface and the support plate. In the context of the present document, the term "linear compressibility" designates the difference between the thickness of the compressible foam without a load applied thereon and the thickness of the compressible foam when compressed in vertical direction. The linear compressibility thus corresponds to the amplitude of the variation of the foam thickness in the full range of load conditions (from an empty seat to a maximally loaded seat).

Preferably, each of the carrier films comprises (includes as a part or consists of) a plastic film (e.g. made of PET, PEN, PI, PEEK, or the like): Each of the electrodes may comprise an electrically conductive layer disposed on one of the carrier films. Such conductive layer could be a printed conductive surface or a metal foil attached to the plastic film.

When the at least two electrodes get into contact, a current path is established between the electrodes and the resistance between the electrodes drops from a high value (open circuit resistance value or integrity check resistance value) to a low value (e.g. ≤100Ω). The resistance drop may be detected (as a change in resistance, current or voltage) by a control and evaluation circuit (e.g. an ASIC) attached to the pressure-responsive seat occupancy sensor unit.

Preferably, the at least two electrodes are interconnected by at least one integrity check component (e.g. a resistor or a diode). The interconnection of the electrodes with such an integrity check component has the advantage that a circuit interruption can be detected.

Advantageously, the support plate includes one or more fixation elements, by means of which the support plate is fixable to a structural frame, a cushion and/or a cushion-supporting spring of a seat. The pressure-responsive seat occupancy sensor unit is thus configured for being arranged on the structural frame and/or the cushion-supporting springs of the seat. As will be appreciated, this environment is little or not influenced by the design of the seat parts that can be readily perceived by the user (such as e.g. the surface, on which the occupant may seat). For a particular car model, the shape of the structural frame and/or the cushion-supporting springs of the seat is normally defined only once, namely at the moment of the seat design. The seat being a part of a car's passive safety concept, it will not be changed after the passive safety concept of a vehicle has been defined. As this happens at an early stage in the development of a car model, the car manufacturer gains more time for making adjustments, if necessary.

The fixation elements may be arranged on a bottom side of the support plate and/or vertically aligned with the support area. Preferably, the support plate comprises a resilient tongue for transmitting a reaction force of the structural frame and/or the cushion-supporting springs opposite to the force applied on the top surface. The resilient tongue can be a part of the support plate, linked by only one side to the rest of support plate.

Alternatively or additionally, the fixations may be arranged at the edges or borders of the support plate.

The pressure-responsive seat occupancy sensor unit is preferably configured in such a way that it can be attached to the seat without any additional mounting equipment. Therefore, a clip-type attachment is preferable. Preferably, at least one of the one or more fixation elements comprises an eyelet for a fastener (clips, clamps, rivets, or the like). Alternatively, the fasteners could also be integrally formed with the support plate.

At least one of the one or more fixation elements may comprise a fastener configured for snapping up a cushion-supporting spring of the seat. Alternatively or additionally at least one of the one or more fixation elements may be configured for fastening the support plate to the foam of the seat.

Advantageously, the pressure-responsive seat occupancy sensor unit comprises a connector able to connect the pressure-responsive seat occupancy sensor unit to a vehicle on-board computer or an airbag controller, e.g. via a CAN bus.

The pressure-responsive seat occupancy sensor unit preferably comprises a cover plate arranged on the compressible foam. The cover plate is preferably coupled to the support plate in such a way that the cover plate may move towards the support plate and compress the compressible foam, thereby causing the compressible foam to penetrate in between the one or more spacers. Preferably, one of the cover plate and the support plate comprises one or more pins and the other one of the cover plate and the support plate comprises one or more guides co-operating with the one or more pins. Alternatively or additionally, the cover plate comprises a rim slidingly coupled with the support plate.

An aspect of the invention concerns a car seat comprising a structural frame, a cushion that may be occupied by a seat occupant, a cushion-supporting spring structure or a seat pan, and a pressure-responsive seat occupancy sensor unit as described herein. The pressure-responsive seat occupancy sensor unit is arranged between the cushion and the cushion-supporting spring structure or the seat pan.

Advantageously the cushion comprises a cavity or recess where the pressure-responsive seat occupancy sensor unit is arranged in.

As will be appreciated, the compressible foam may be the cushion.

BRIEF DESCRIPTION OF THE DRAWINGS

Preferred embodiments of the invention will now be described, by way of example, with reference to the accompanying drawings, in which.

DETAILED DESCRIPTION

Figure 1:
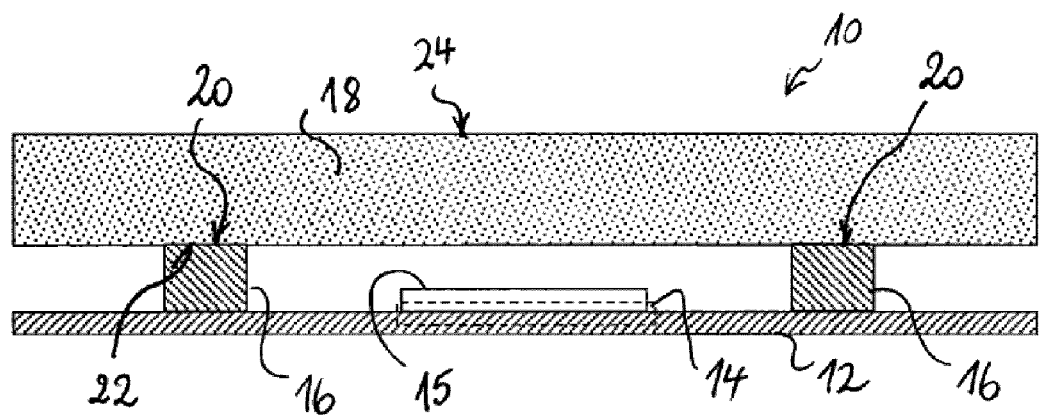
FIG. 1 is a schematic cross sectional view of a pressure-responsive seat occupancy sensor unit according to a first preferred embodiment of the invention in unloaded condition (empty seat)
Figure 2:
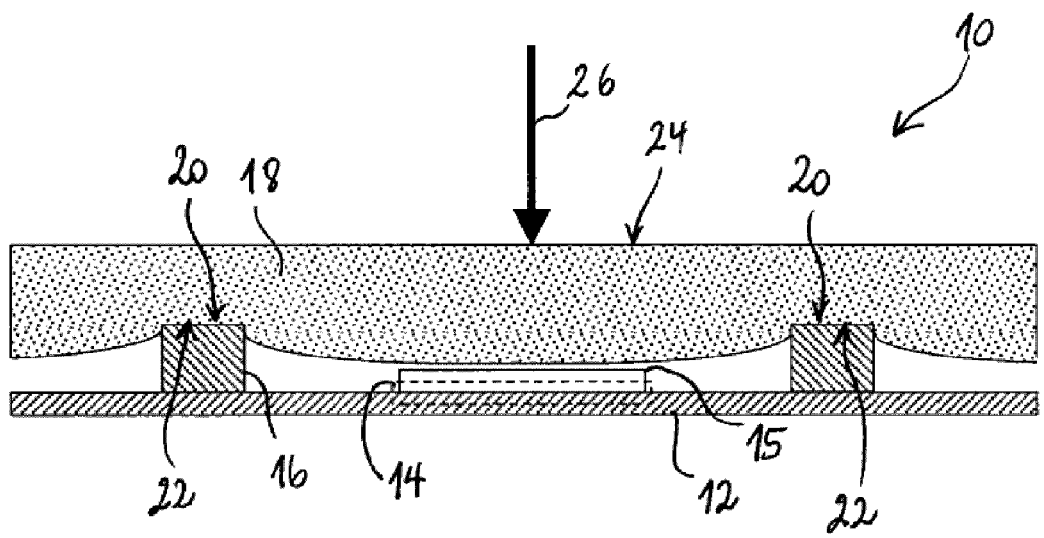
FIG. 2 is a schematic cross sectional view of the pressure-responsive seat occupancy sensor unit of FIG. 1 in lightly loaded condition (seat carrying a light object)
Figure 3:
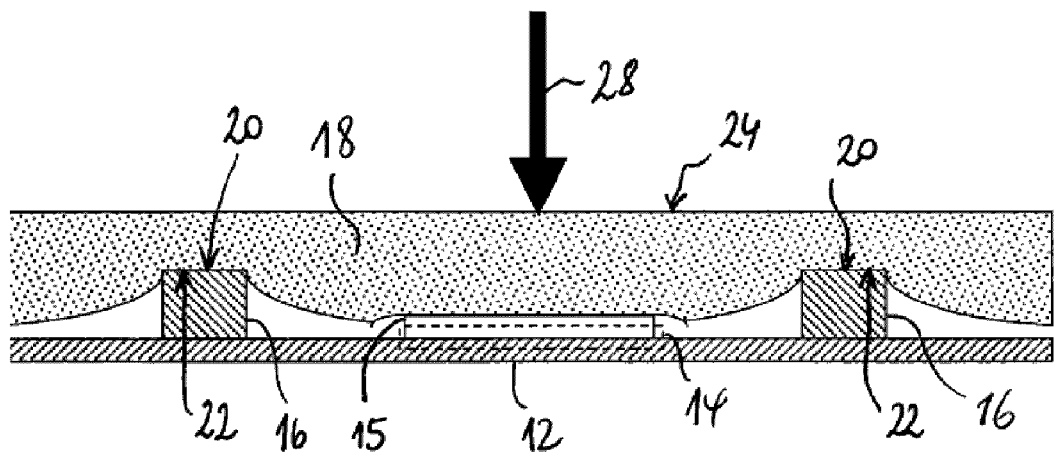
FIG. 3 is a schematic cross sectional view of the pressure-responsive seat occupancy sensor unit of FIG. 1 in loaded condition (occupied seat)

FIGS. 1 to 3 show a pressure-responsive seat occupancy sensor unit 10 according to a first preferred embodiment of the invention. The pressure-responsive seat occupancy sensor unit 10 comprises a support plate 12 with a support area 14, a pressure-responsive membrane switch 15 arranged in the support area, one or more spacers 16 arranged around the support area 14 and a compressible foam 18. The one or more spacers 16 protrude from the support plate 12 and define an upper surface 20, which is raised with respect to the support area 14. The compressible foam 18 rests with its bottom surface 22 on the upper surface 20 of the one or more spacers 16.

FIG. 1 shows the pressure-responsive seat occupancy sensor unit 10 when no external force is applied on the top surface 24 of the compressible foam 18. The illustrated situation thus corresponds to an empty seat. As can be seen in FIG. 1, the compressible foam 18 does not (or only slightly) penetrate in between the one or more spacers 16.

FIG. 2 shows the pressure-responsive seat occupancy sensor unit 10 when a force 26 is applied on the top surface 24 that is less than the threshold force. The compressible foam 18 penetrates in between the one or more spacers 16 but does not contact the pressure-responsive membrane switch 15.

FIG. 3 shows the pressure-responsive seat occupancy sensor unit 10 when a force 28 is applied on the top surface 24 that exceeds the threshold force. The compressible foam 18 penetrates in between the one or more spacers 16 and pushes against the pressure-responsive membrane switch 15. In response to the pressure applied on it by the compressible foam 18, the membrane switch 15 is activated, i.e. the upper carrier film is pushed against the lower carrier film, which brings the at least two electrodes into contact with each other and closes an electric circuit.

Figure 4:
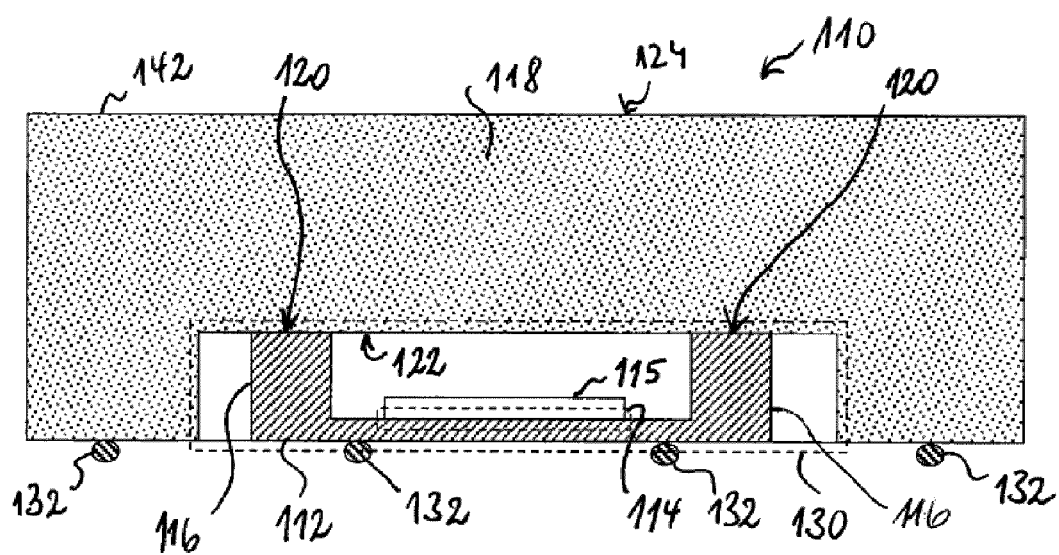
FIG. 4 is a schematic cross sectional view of a pressure-responsive seat occupancy sensor unit according to a second preferred embodiment of the invention.
Figure 5:
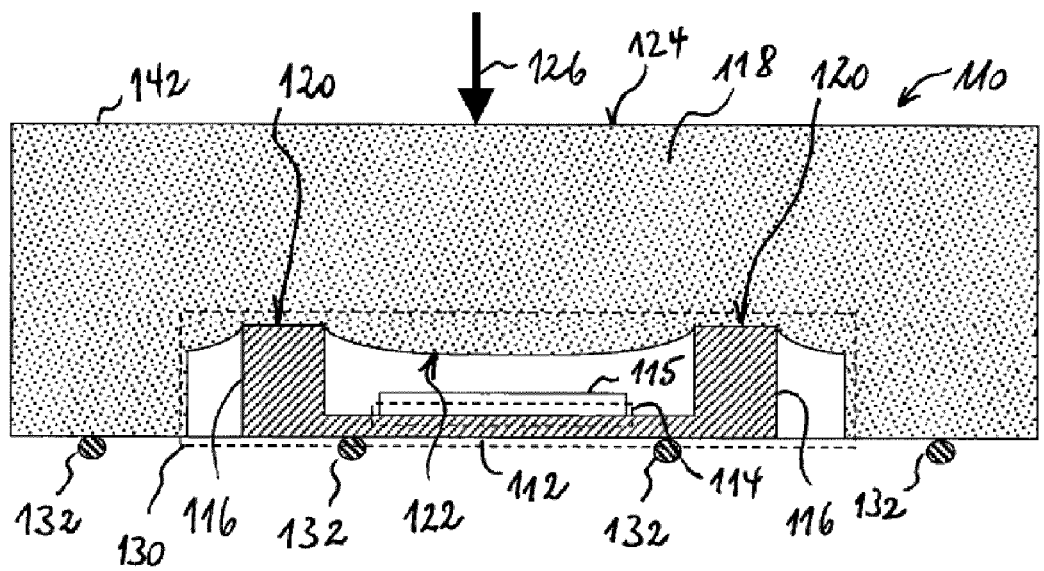
FIG. 5 is a schematic cross sectional view of the pressure-responsive seat occupancy sensor unit of FIG. 4, when a load (less than the threshold force) is applied.
Figure 6:
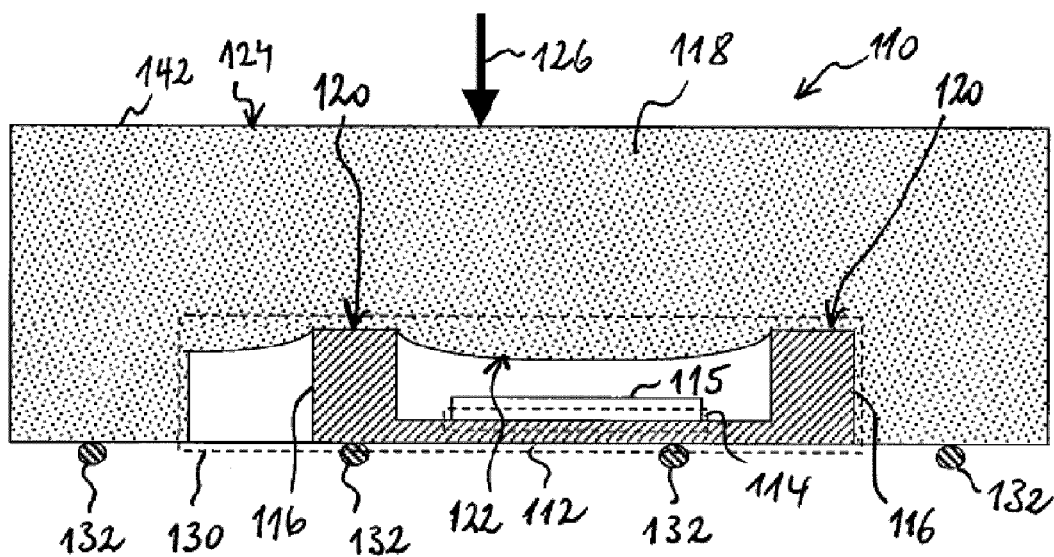
FIG. 6 illustrates the pressure-responsive seat occupancy sensor unit of FIG. 4 when laterally displaced.

FIGS. 4 to 6 show a pressure-responsive seat occupancy sensor unit 110 according to a second preferred embodiment of the invention. The seat occupancy sensor unit 110 comprises a support plate 112 with a support area 114, a pressure-responsive membrane switch 115, one or more spacers 116 arranged around the support area 114 and a compressible foam 118, which forms the cushion 142 of a vehicle seat. The one or more spacers 116 protrude from the support plate 112, and define an upper surface 120 raised with respect to the support area 114. The compressible foam 118 rests with its bottom surface 122 on the upper surface 120 of the one or more spacers 116. The support plate 112 and the one or more spacers 116 are arranged in a recess 130 in the compressible foam 118. The compressible foam 118 is arranged on cushion-supporting springs 132. The cushion-supporting springs 132 also carry the seat occupancy sensor unit 110 and push it against the bottom surface 122 of the compressible foam 118.

FIG. 4 shows the pressure-responsive seat occupancy sensor unit 110 in an empty seat situation. The compressible foam 118 does not (or only slightly) penetrate in between the one or more spacers.

FIG. 5 shows the pressure-responsive seat occupancy sensor unit 110 when a force 126 is applied on the top surface that is less than the threshold force. The compressible foam 118 penetrates in between the one or more spacers 116 but does not contact the pressure-responsive membrane switch 115.

FIG. 6 illustrates that the construction of the pressure-responsive seat occupancy sensor unit 110 makes it robust against variations in position. Indeed, the spacers 116 delimit a cavity with fixed dimensions, into which the foam 118 has to protrude in order to activate the pressure-responsive membrane switch 115. The spacers 116 thus guarantee the same initial conditions whatever the lateral position of the pressure-responsive seat occupancy sensor unit 110 between the springs 132 and the foam 118.

Figure 7:
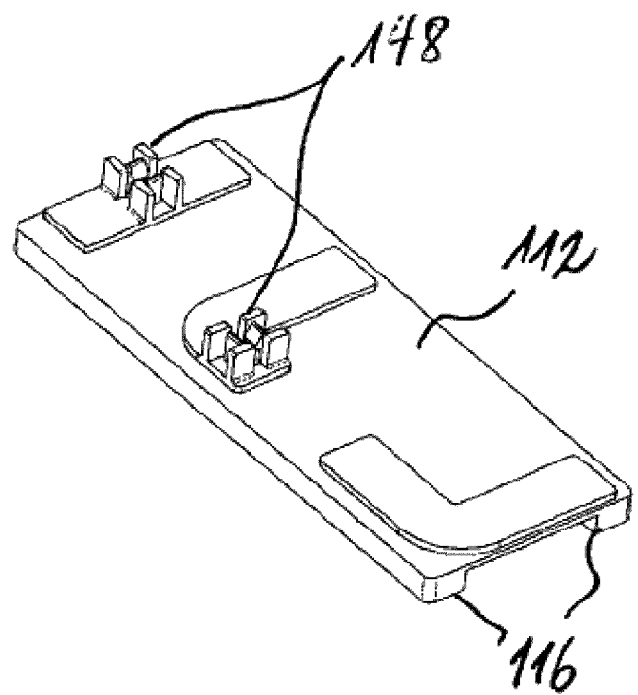
FIG. 7 is a first perspective view of an example of a support plate for a pressure-responsive seat occupancy sensor unit as shown in FIGS. 4-6.
Figure 8:
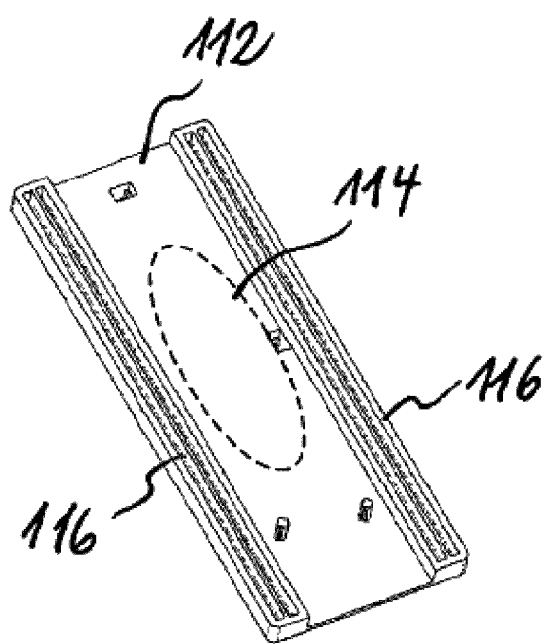
FIG. 8 is a second perspective view of the support plate of FIG. 7

FIGS. 7 and 8 are perspective views of a preferred example of a support plate 112 usable in the second embodiment of the invention. As illustrated in FIG. 7, the support plate 112 comprises fixation elements 148 (such as e.g. clips or hooks) arranged on the bottom side of the support plate 112 for fixing it on one or more cushion-supporting springs. On the upper side of the support plate 112 (FIG. 8), spacers 116 are arranged around the support area 114 for the pressure-responsive membrane switch (not shown in FIG. 8). The support plate 112, the spacers 116 and the fixation elements 148 are preferably made of a single piece of a material such as e.g. plastic.

Figure 9:
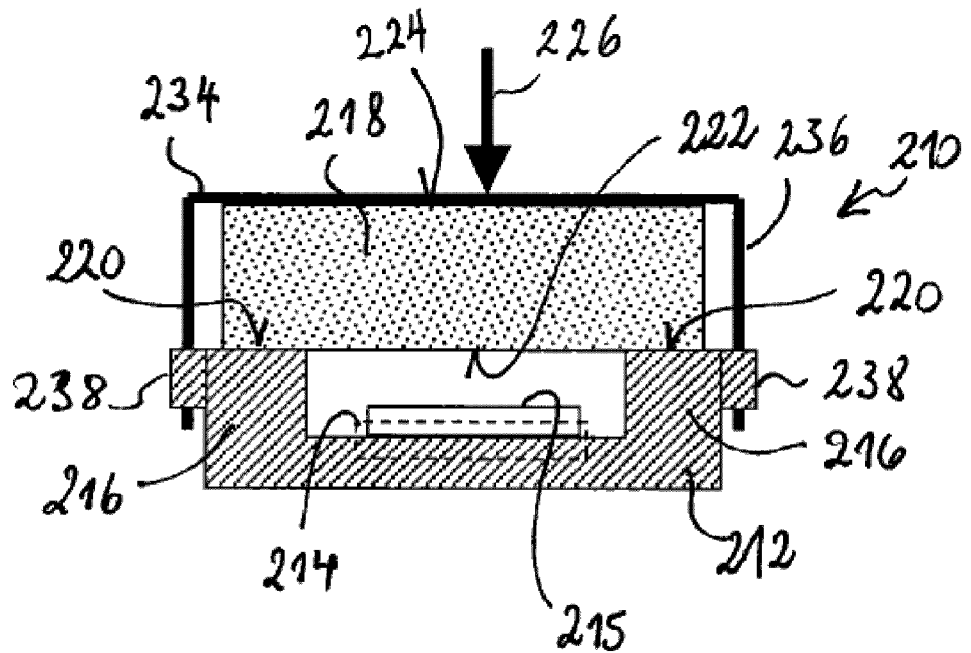
FIG. 9 is a schematic cross sectional view of a pressure-responsive seat occupancy sensor unit according to a third preferred embodiment of the invention.

FIG. 9 shows a pressure-responsive seat occupancy sensor unit 210 according to a third preferred embodiment of the invention. The pressure-responsive seat occupancy sensor unit 210 comprises a support plate 212 with a support area 214, a pressure-responsive membrane switch 215, one or more spacers 216 arranged around the support area 214 and a compressible foam 218. The one or more spacers 216 protrude from the support plate 212 and define an upper surface 220 raised with respect to the support area 214. The compressible foam 216 rests with its bottom surface 222 on the upper surface 220 of the one or more spacers 216. A cover 234 is arranged over the compressible foam 218. The cover 234 is mounted mobile in translation on the support plate 212 so as to push the compressible foam 218 into the recess between the one or more spacers 216 when a force 226 is applied on the cover 234. The cover 234 comprises a plurality of pins 236 while the support plate 212 comprises a plurality of guides 238 co-operating with the pins 236. The pins 236 and the guides 238 form a prismatic joint. Thanks to the cover 234 the compression of the compressible foam is more homogeneous.

Figure 10:
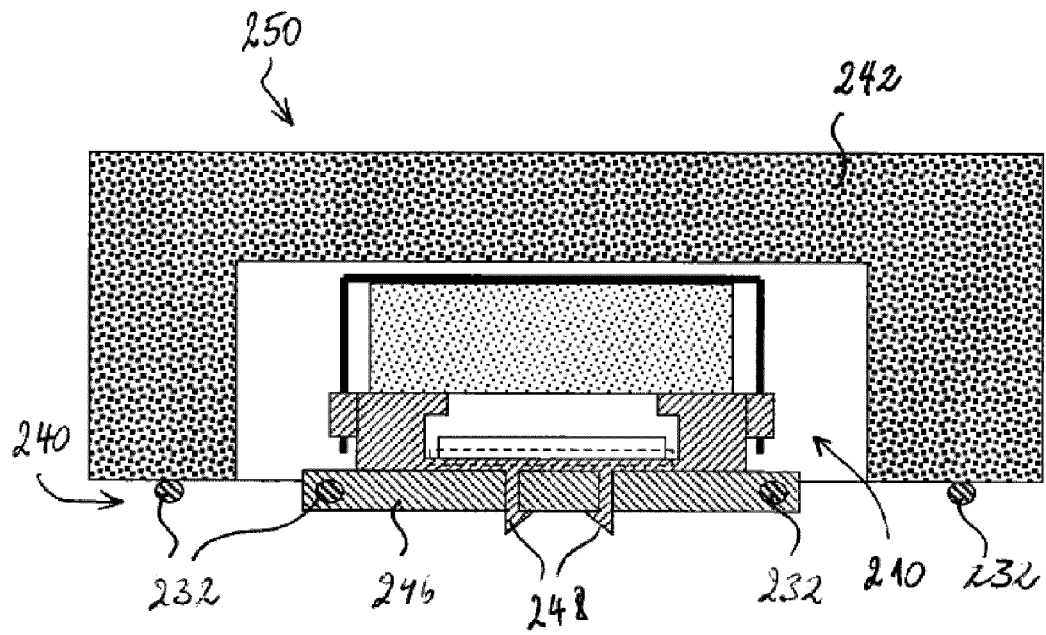
FIG. 10 is a schematic cross sectional view of a seating portion of a vehicle seat comprising a pressure-responsive seat occupancy sensor unit as shown in FIG. 9

FIG. 10 shows a part of a seating portion 250 of a vehicle seat, in which a pressure-responsive seat occupancy sensor unit 210 of the type illustrated in FIG. 9 is arranged. The support plate 212 rests on a suspension mat 240 that supports the cushion 242 of the vehicle seat. The suspension mat 240 includes a plurality of cushion-supporting springs 232 (e.g. made of steel), which are interconnected by a plurality of plastic cross-links. FIG. 8 shows only one cross-link 246, which carries the seat occupancy sensor unit 210. The support plate 212 of the seat occupancy sensor unit 210 includes fasteners 248 (e.g. clips or hook elements), by means of which the support plate 212 is fixed to the cross-link 246.

Figure 11:
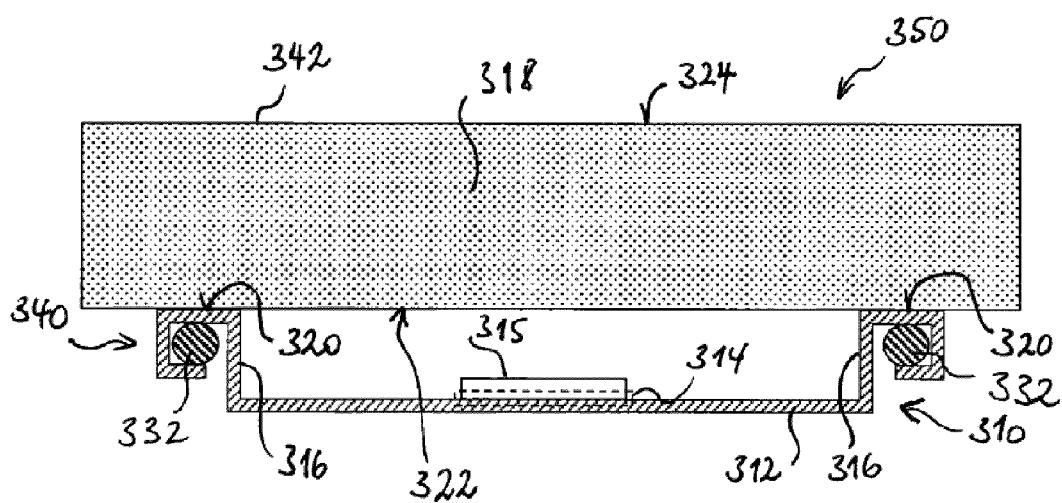
FIG. 11 is a schematic cross sectional view of a pressure-responsive seat occupancy sensor unit according to a fourth preferred embodiment of the invention.

FIG. 11 shows the seating portion 350 of a vehicle seat that comprises a pressure-responsive seat occupancy sensor unit 310 according to a fourth preferred embodiment of the invention. The seat occupancy sensor unit 310 is integrated in the cushion-supporting suspension mat 340 of the seating portion 350. The suspension mat 340 supports the cushion 342 of the seating portion 350, which is made of compressible foam 318.

The pressure-responsive seat occupancy sensor unit 310 comprises a support plate 312 with a support area 314, a pressure-responsive membrane switch 315 and a plurality of spacers 316 arranged around the support area 314. The spacers 316 protrude from the support plate 312 and define an upper surface 320 raised with respect to the support area 314. The compressible foam 318 of the cushion 342 rests with its bottom surface 322 on the upper surface 320 of the spacers 316.

The support plate 312 is hung up between two cushion-supporting springs 332. When the seat is occupied, the springs 332 provide the reaction force opposed to the weight of the occupant. The foam 318 is compressed by the occupant and the cushion-supporting mat, as a consequence of which it protrudes into the space between the spacers 316. If the compression (i.e. the weight of the occupant) is sufficient, the bottom surface 322 of the foam 318 activates the pressure-responsive membrane switch 315.

Those skilled will appreciate that the pressure-responsive seat occupancy sensor unit is preferably of modular construction. The support plate may be configured such that is suitable for a large group of vehicle seats. Any fixation elements not needed for fixation on a particular type of seat could be removed before, during or even after the integration of the unit into the seat. If modification of the threshold force is necessary, that can be achieved by design of the one or more spacers. The other components of the unit need not be modified. As will further be appreciated, one may choose standard materials for the pressure-responsive seat occupancy sensor unit; these can thus be ordered independently from any specific customer application.

While some embodiments has been described in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A pressure-responsive seat occupancy sensor unit for detecting an occupancy state of a seat, e.g. of a vehicle seat, comprising:
   a support plate with a support area;
   a pressure-responsive membrane switch arranged in said support area, said pressure-responsive membrane switch comprising a first carrier film and a second carrier film spaced from each other by a spacer film, said spacer film having therein an opening defining a cell, said pressure-responsive membrane switch comprising at least two electrodes arranged in facing relationship with each other in said cell on said first and said second carrier film, respectively, in such a way that they are brought closer together, possibly into contact with each other, when pressure is applied on said pressure-responsive membrane switch;
   one or more spacers arranged around said support area, said one or more spacers defining an upper surface raised with respect to said support area;
   a compressible foam comprising a bottom surface and a top surface, said foam resting with said bottom surface on said upper surface of said one or more spacers, said foam being disposed in such a way that it penetrates in between said one or more spacers and activates said pressure-responsive membrane switch in response to a force applied on said top surface that exceeds a certain threshold force; and
   a distance is disposed between said bottom surface and said pressure-responsive membrane when the seat is not-occupied, such that when the force is not applied on said top surface, then said bottom surface and the pressure-responsive membrane switch are not in contact, and the compressible foam does not penetrate in between said one or more spacers.

2. The pressure-responsive seat occupancy sensor unit as claimed in claim 1, wherein said one or more spacers are substantially incompressible.

3. The pressure-responsive seat occupancy sensor unit as claimed in claim 1, wherein said one or more spacers comprise at least one of a plurality of struts or a raised border.

4. The pressure-responsive seat occupancy sensor unit as claimed in claim 1, wherein said one or more spacers and said support plate form one piece.

5. The pressure-responsive seat occupancy sensor unit as claimed in claim 1, wherein said compressible foam has a linear compressibility greater than the difference in height between said upper surface and said support plate.

6. The pressure-responsive seat occupancy sensor unit as claimed in claim 1, wherein said support plate includes one or more fixation elements, by means of which said support plate is fixable to a structural frame and/or a cushion-supporting spring of said seat.

7. The pressure-responsive seat occupancy sensor unit as claimed in claim 6, wherein said fixation elements are arranged on a bottom side of said support plate and/or vertically aligned with said support area.

8. The pressure-responsive seat occupancy sensor unit as claimed in claim 7, wherein said support plate comprises a resilient tongue for transmitting a reaction force of said structural frame and/or said cushion-supporting spring opposite to said force applied on said top surface.

9. The pressure-responsive seat occupancy sensor unit as claimed in claim 1, comprising a connector able to connect said occupancy sensor unit to at least one of a vehicle on-board computer and an airbag controller.

10. The pressure-responsive seat occupancy sensor unit as claimed in claim 1, comprising a cover plate arranged on said compressible foam.

11. The pressure-responsive seat occupancy sensor unit as claimed in claim 10, wherein said cover plate is coupled to said support plate in such a way that said cover plate may move towards said support plate and compress said compressible foam, thereby causing said compressible foam to penetrate in between said one or more spacers.

12. The pressure-responsive seat occupancy sensor unit as claimed in claim 11, wherein said cover plate comprises a rim slidingly coupled with said support plate.

13. The pressure-responsive seat occupancy sensor unit as claimed in claim 12, wherein one of said cover plate and said support plate comprises one or more pins and wherein the other one of said cover plate and said support plate comprises one or more guides co-operating with said one or more pins.

14. A car seat comprising
   a structural frame,
   a cushion that may be occupied by a seat occupant, at least one of a cushion-supporting spring structure and seat pan, and a pressure-responsive seat occupancy sensor unit for detecting an occupancy state of a seat, said pressure-responsive seat occupancy sensor unit comprising a support plate with a support area;

a pressure-responsive membrane switch arranged in said support area, said pressure-responsive membrane switch comprising a first carrier film and a second carrier film spaced from each other by a spacer film, said spacer film having therein an opening defining a cell, said pressure-responsive membrane switch comprising at least two electrodes arranged in facing relationship with each other in said cell on said first and said second carrier film, respectively, in such a way that they are brought closer together, possibly into contact with each other, when pressure is applied on said pressure-responsive membrane switch;

one or more spacers arranged around said support area, said one or more spacers defining an upper surface raised with respect to said support area;

a compressible foam comprising a bottom surface and a top surface, said foam resting with said bottom surface on said upper surface of said one or more spacers, said foam being disposed in such a way that it penetrates in between said one or more spacers and activates said pressure-responsive membrane switch in response to a force applied on said top surface that exceeds a certain threshold force, said pressure-responsive seat occupancy sensor unit being arranged between said cushion and said at least one of a cushion-supporting spring structure and seat pan; and a distance is disposed between said bottom surface and said pressure-responsive seat occupancy sensor unit when the seat is not-occupied, such that when the force is not applied on said top surface, then said bottom surface and the pressure-responsive membrane switch are not in contact, and the compressible foam does not penetrate in between said one or more spacers.

15. The car seat as claimed in claim 14, wherein said cushion comprises a cavity or recess, which the pressure-responsive seat occupancy sensor unit is arranged in.

16. The car seat as claimed in claim 14, wherein said pressure-responsive seat occupancy sensor unit comprises a cover plate arranged on said compressible foam.

17. The car seat as claimed in claim 15, wherein said cover plate is coupled to said support plate in such a way that said cover plate may move towards said support plate and compress said compressible foam, thereby causing said compressible foam to penetrate in between said one or more spacers.

18. The pressure-responsive seat occupancy sensor unit as claimed in claim 16, wherein said cover plate comprises a rim slidingly coupled with said support plate.

19. The pressure-responsive seat occupancy sensor unit as claimed in claim 17, wherein one of said cover plate and said support plate comprises one or more pins and wherein the other one of said cover plate and said support plate comprises one or more guides co-operating with said one or more pins.

* * * * *